This invention relates to devices for indicating the liquid level in storage batteries and more particularly to devices which utilize light signals to indicate the liquid level.

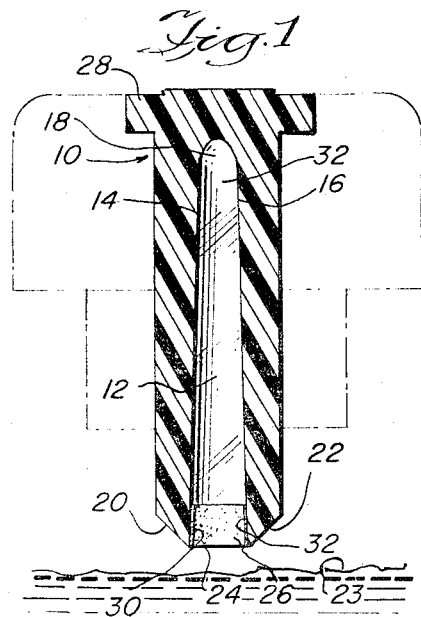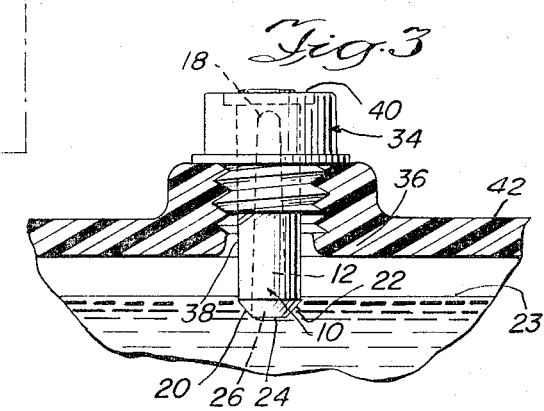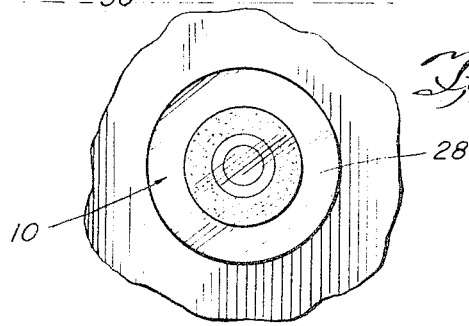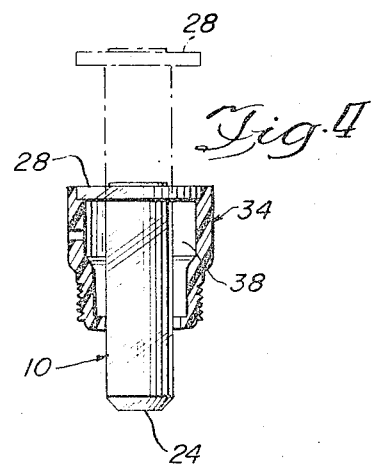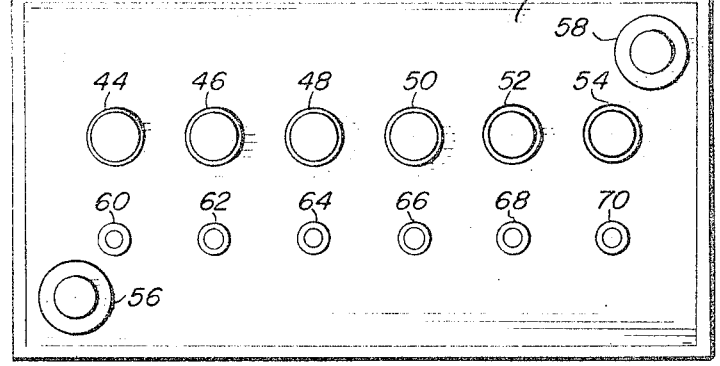
INVENTOR
JOHN V. McHUGH
BY Joan L. Hutchinson
ATTORNEY 3,367,184
LIQUID LEVEL INDICATOR
John V. McHugh, Evanston, Ill., assignor to The Richardson Company, Melrose Park, Ill., a corporation of Ohio
Filed Mar. 29, 1966, Ser. No. 538,259
8 Claims. (Cl. 73—327)

Storage batteries are composed of a plurality of individual cells containing electrodes immersed in liquid electrolyte. Commonly, the electrodes are lead and lead dioxide plates and the electrolyte is a sulfuric acid solution. In operation of the battery, some of the liquid electrolyte is lost which exposes portions of the electrodes to atmospheric conditions. It is important to replace the lost liquid to control the upper limit of concentration in the electrolyte and to prevent permanent damage to the electrodes.

In the past, devices have been developed to indicate when the liquid should be added to the battery. Some of these devices have utilized light signals to indicate when the liquid level is low. Generally, these devices have been incorporated into one or more of the vent plugs of the battery and have been conically shaped solids as illustrated by the devices of U.S. 1,883,971 and U.S. 2,627,748.

These solid indicators have not always been entirely satisfactory in use. They tend to have a significant cost and problems in production. Usually, they are molded from plastic material and because of their bulk, tend upon cooling to become slightly distorted in shape which adversely affects their transmission of the light signal. This distortion commonly causes depressions in otherwise flat surfaces particularly at the ends of the solid shapes, which limits their effectiveness in transmitting the desired signal.

Therefore, one object of this invention is a liquid level indicator for storage batteries which is relatively inexpensive.

Another object of the invention is a liquid level indicator utilizing light signals and exhibiting less distortion in shape.

These and other objects of the invention will become more apparent from the drawing and specification set forth in more detail hereinafter.

Briefly, the invention comprises a liquid level indicator which utilizes light signals and has a light transmitting hollow body with an opening in its lower end and inner side walls which extend downwardly in an outward taper at a slight angle. These inner walls form a hollow core which terminates in an irregular shape below the upper end of the body.

The resultant indicator exhibits reduced distortion in its shape and can be readily produced at low cost. The indicator may be incorporated into a vent plug for insertion into a vent well on the battery cover, and more advantageously may be rigidly mounted in the cover over at least one of the cells which permits the indicator to also signal when the correct level has been reached during the addition of fluid to the cell through the vent well.

Having thus indicated the general nature of the invention, reference is made to the accompanying drawings forming a part of this specification and showing one illustrative embodiment of the invention, wherein:

FIGURE 1 is a cross-sectional view of the liquid level indicator illustrating the hollow body with its lower opening, its tapered inner walls and irregular upper end of the hollow core; and the low level of the liquid.

FIGURE 2 is a top view of the indicator shown in FIGURE 1 illustrating the bulls-eye light pattern being transmitted by the indicator when the liquid level is low.

FIGURE 3 is a cross-sectional view of a liquid level indicator mounted in a vent plug positioned in a vent well on a battery cover.

FIGURE 4 is a cross-sectional view of a modified liquid level indicator illustrating an upper flange which serves as the top for the vent plug.

FIGURE 5 is a top view of a battery cover illustrating liquid level indicators mounted in the battery cover over the cells.

Turning now to the drawings for a more detailed description of the invention, and particularly to FIGURE 1, the number 10 designates the hollow body of the indicator with its hollow core 12 formed by adjoining side walls 14 and 16, upper inner end 18 of the hollow core 12, and reflecting surfaces 20 and 22. As illustrated, side walls 14 and 16 extend downwardly in an outward taper at a slight angle not exceeding about 5° to the lower end 24 of body 10 and forms opening 26. If the angle is not within the recited range, the light signal tends to remain irrespective of the liquid level. Also as illustrated, the lower end 24 has conically shaped, oppositely disposed, reflecting surfaces 20 and 22 to reflect light upwardly when the liquid level 23 is below the reflecting surfaces 20 and 22. When the indicator is used, the light will be transmitted downwardly to one surface, across to the other surface, and upwardly as the signal. Therefore, advantageously, reflecting surfaces 20 and 22 form a right angle.

Inner side walls 14 and 16 terminate below the upper end 28 in an irregular surface 18 to prevent the transmission of light therethrough. The irregular surface may be rippled or circular or the like. Suitably, the upper end of the indicator is flat or rounded to magnify the light signal. Although not critical to its operation, the indicator may include a color medium, as illustrated by colored coatings 30 and 32, around opening 26 on body 10 to produce a color signal when level 23 is below reflecting surfaces 20 and 22. Advantageously, the color is red to indicate to the observer that a corrective action is necessary.

When replacement liquid is added to the battery, the liquid will contact the reflecting surfaces and the light will be refracted into the liquid and will not pass significantly up to the upper end 28 of the indicator. Therefore, the appearance of the indicator at the upper end 28 will be dark.

Advantageously, for convenience in installation, the indicator has a cylindrically shaped body 10 with a flat upper end 28. Also, the reflecting surfaces are at essentially 45° with respect to the longitudinal axis of body 10, and the lower end 24 of body 10 has a color medium around opening 26.

FIGURE 2 illustrates the appearance of the light signal under the liquid level conditions of FIGURE 1. As illustrated, the pattern is similar to a bulls-eye.

As illustrated in FIGURE 3, the indicator may be installed in a vent plug 34 which is inserted in vent well 36. In FIGURE 3, vent plug 34 includes housing 38 with cover 40 plus hollow body 10 of the indicator which extends in a downward direction.

Advantageously, as illustrated in FIGURE 4, the upper end 28 may be flanged shaped to serve as the top of the housing 38 of vent plug 34. In that way, the combination of vent plug and indicator may be a two-piece molded vent plug which reduces its cost.

Illustrated in FIGURE 5 in a battery cover 42 with a plurality of vent wells 44, 46, 48, 50, 52 and 54; electrode wells 56 and 58, and a plurality of indicators 60, 62, 64, 66, 68 and 70 rigidly mounted in cover 42 in positions corresponding to the cells of the battery. It is to be understood that only one indicator may be in cover 42 because of the usual correlation between level in one cell and that in the other cells. However, it is particularly advantageous when using the indicator to signal when the correct level has been reached during the addition of liquid, to have indicators in position over all of the cells.

Also, it is advantageous when the indicators are rigidly mounted in the cover 42, to have the upper ends of the indicators project a small distance above the cover to permit cleaning the indicators to provide optimum observation conditions.

For installation in the battery cover 42 or vent plug 34, the indicator may be provided with a Morris taper, or it may be threaded, taper locked, glued or flanged.

The above-described indicator offers many advantages in its use. In many instances the cost for six indicators for a six cell battery is in the same order as the cost for only one of the solid indicators.

Having described the invention and certain exemplary embodiments, the same is only intended to be limited by the scope of the following claims.

I claim:

1. A liquid level indicator for use with storage batteries to signal when additional liquid should be added to the battery, the indicator comprising a light transmitting, hollow symmetrical body with the hollow core extending downwardly in an outward taper at a slight angle not exceeding about 5° to the lower end of the body and forming an opening in said lower end, the lower end having a conically shaped, reflecting surface to reflect light upwardly when the liquid level is below the reflecting surface and to disperse the light when the liquid level is in contact with said surface, the hollow core of the body terminating in a surface below the upper end of the body with this surface being irregular to prevent the transmission of light therethrough.

2. The liquid level indicator of claim 1 wherein the lower end of the body has a colored medium around the opening to produce a color signal when the level is below the reflecting surface.

3. The liquid level indicator of claim 1 wherein the body is cylindrically shaped with a flat upper end, the conically shaped, reflecting surface forming a right angle at the apex thereof.

4. The liquid level indicator of claim 3 wherein the lower end of the body has a colored medium around the opening to produce a color signal when the level is below the reflecting surface.

5. A vent plug comprising a housing and the liquid level indicator of claim 1 positioned within the housing and extending therefrom in a downward direction.

6. A two-piece molded vent plug comprising a one-piece hollow housing and the liquid level indicator of claim 1 wherein the upper end of the indicator is flange-shaped to serve as the top of the housing, the indicator being positioned within the housing and extending therefrom in a downward direction.

7. A battery cover with a plurality of vent wells for a plurality of cells and at least one liquid level indicator of claim 1 rigidly mounted in the cover in a position corresponding to one of the cells and adapted to signal when the liquid level in the battery is low and also when the correct level has been reached during the addition of liquid through the corresponding vent well.

8. A battery cover with a plurality of vent wells for a plurality of cells and at least one liquid level indicator of claim 2 rigidly mounted in the cover in a position corresponding to one of the cells and adapted to signal when the liquid level in the battery is low and also when the correct level has been reached during the addition of liquid through the corresponding vent well.

References Cited

UNITED STATES PATENTS

| | | | |
|---|---|---|---|
| 2,554,557 | 5/1951 | Brown et al. | 73—327 |
| 2,704,454 | 3/1955 | Martin | 73—327 |
| 3,054,291 | 9/1962 | Landwer | 73—293 |

LOUIS R. PRINCE, *Primary Examiner.*

DANIEL M. YASICH, *Assistant Examiner.*